Aug. 24, 1943.   H. P. SMITH   2,327,937
AGRICULTURAL IMPLEMENT
Filed Dec. 31, 1940   3 Sheets-Sheet 3
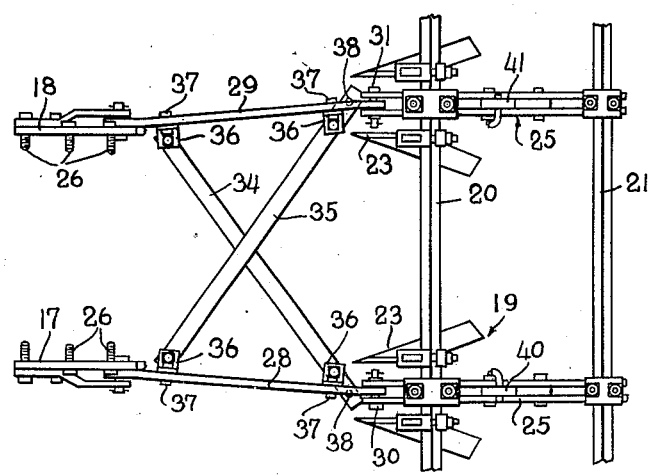
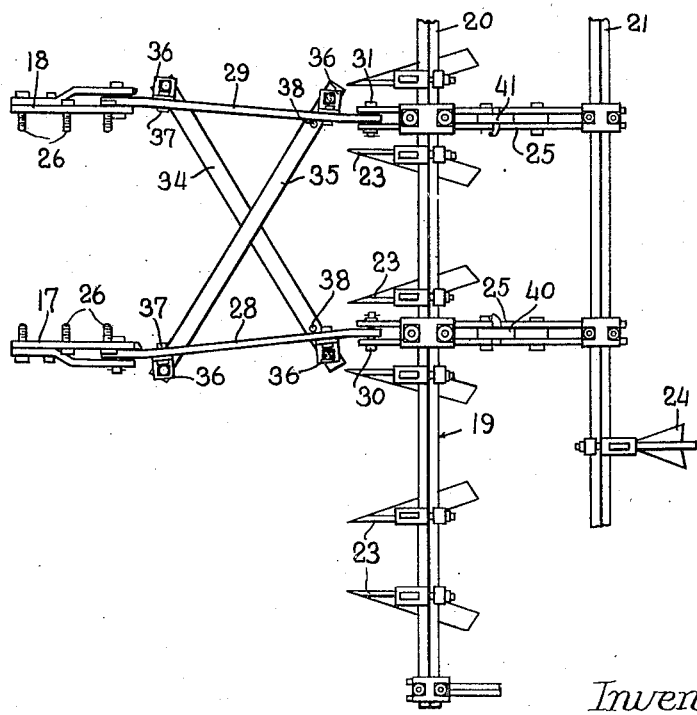
Inventor
Hiram P. Smith
By Paul O. Pippel
Atty.

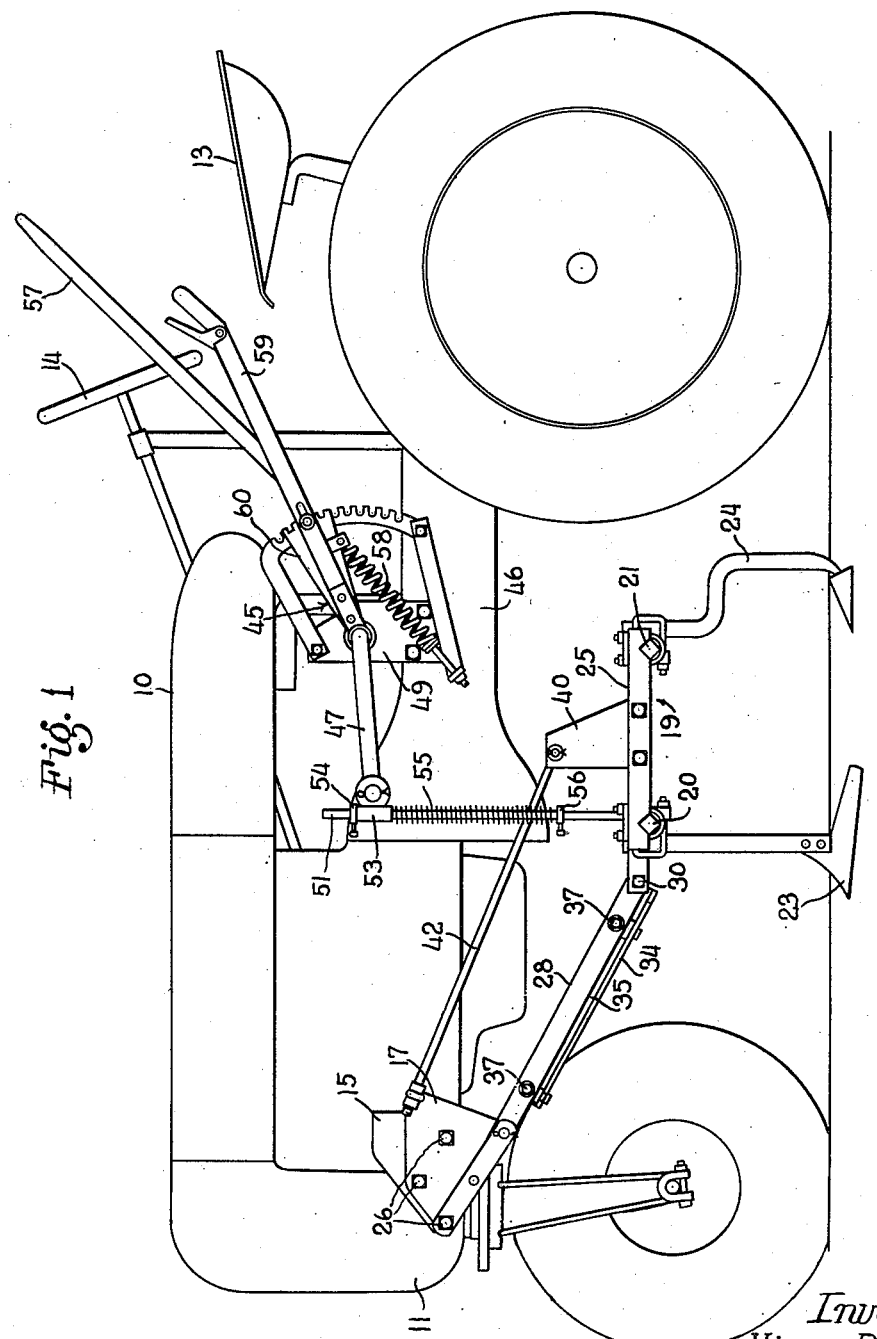

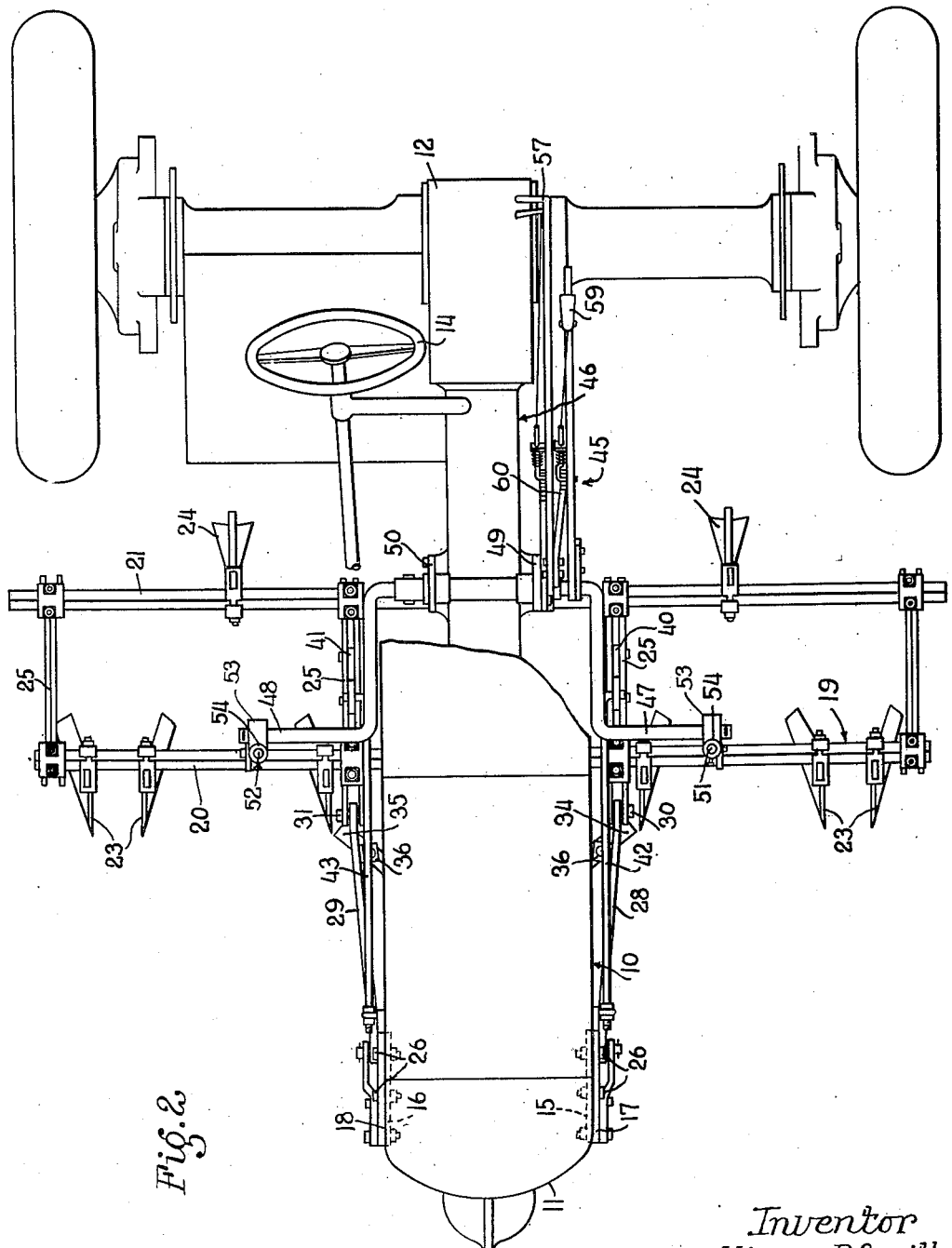

Patented Aug. 24, 1943

2,327,937

UNITED STATES PATENT OFFICE 2,327,937

AGRICULTURAL IMPLEMENT

Hiram P. Smith, Canton, Ill., assignor to International Harvester Company, a corporation of New Jersey Application December 31, 1940, Serial No. 372,584

6 Claims. (Cl. 97—47)

This invention relates to agricultural implements, and more particularly to means for the attaching of the same to a tool-supporting means or tractor.

An object of the present invention is to provide for an attachment of an implement incorporating a main tool-carrying frame or tool bar, and an arrangement for the connection of the usual drag links to the tool-carrying frame or tool bar wherein the same can be rearranged to permit a different lateral spacing of the working tools on the tool-carrying frame. In the connecting of these drag links to the tool-carrying frame, they are often located where they may interfere with the positioning of tools transversely on the frame.

It is another object of the invention to provide a bracing means intermediate the drag links which can be adapted for different positioning of the drag links, such as when they are arranged with their points of connection to the tool frame in a narrow setting, or when they are arranged with their points of connection with the tool frame in a wide setting.

According to the present invention, the drag links forming a part of the working tool attachment are respectively made so that one end is offset with respect to the other end. When these links are connected to spaced portions on the tractor, their rearward ends will be in converging or diverging relationship, depending upon whether they are offset inwardly or outwardly from their points of connection with the tractor. If the drag links diverge from their connections with the tractor, the working tools are arranged for the wide setting, whereas, if the drag links converge, the working tools can be arranged for a narrow setting. The tool frame comprises generally a transversely extending tool bar to which pairs of cultivator shovels are connected in spaced relationship with respect to each other along the tool bar. Each pair is adapted to work upon a single crop row to cultivate the same. When it is desired to have the pairs arranged in more narrow spacing, the drag links are reversed to permit less distance between their points of connection with the tool bar, and the working tools positioned along the tool bar near to these points of connection are thereby permitted to be moved inwardly for the cultivating of crops which are more narrowly spaced. Associated with the drag links and disposed therebetween is a bracing means including two diagonally disposed bracing members. These bracing members are so connected to the drag link that they may be detached upon reversing of the drag links for the different settings. Angle pieces are provided and can be respectively connected to the drag links at one side of the same or to the other side of the same. Also, adjusting holes are provided in the diagonal members to make the diagonal members more adaptable to the different settings of the drag link members.

For other objects and for a better understanding of the invention, reference may be had to the following detailed description taken in connection with the accompanying drawings, in which:

Figure 1 is a side view, in elevation, of a tractor with the cultivator attachment embodying the features of the present invention attached thereto;

Figure 2 is a plan view of the tractor and implement attachment;

Figure 3 is a fragmentary view of the cultivator attachment illustrating the offset arrangement of the drag links connected to the tool bar for the wider setting of the cultivator tools; and, Figure 4 is a view similar to Figure 3, but with the drag links connected to the tool bar for the narrow setting of the cultivating tools.

Referring now particularly to Figures 1 and 2, there is shown a tractor or tool-supporting means 10 having a forward end portion 11 and a rear axle portion 12, on which is located an operator's station 13, from which the operator may steer the tractor by means of a steering wheel 14. On the forward portion of the tractor, there are spaced portions 15 and 16 to which are connected respectively the attaching portions 17 and 18 of a cultivator or working-tool attachment, indicated generally at 19. This cultivator tool attachment is of the vegetable cultivator type and includes generally two transversely extending tool bars 20 and 21, on the former of which there are connected pairs of working tools 23, while on the latter tool bar are connected cultivator tools 24 arranged to work in offset relationship to the pairs of tools 23, to cultivate midway between the crop rows. Each pair of cultivator shovels 23 respectively straddles the crop row. With the arrangement shown, four crop rows are cultivated at one time, there being four pairs of working tools carried by the transverse tool bar 20. The transverse tool bar 21 is connected to the transverse tool bar 20 in longitudinal spaced relationship by means of longitudinally extending clamp means 25 adapted to be respectively clamped to the tool bars 20 and 21. The tool bars 20 and 21 are of square cross-section, and the clamping means is particularly designed for clamping the working tools 23 to the tool bar 20, so that the elements so clamped will be held definitely against any rotational movement in a vertical plane. The tool bars 20 and 21 and the clamping means 25 connected between the same form a rigid tool-carrying frame, and the working tools 23, by means of their respective clamping elements, are held rigid on the tool-carrying frame. The two clamping means 25 located intermediate the ends of the frame serve as means to which the tool-carrying frame or tool bar may be attached to attaching plates 17 and 18, which are in turn adapted for attachment to the spaced portions 15 and 16 by means of the attaching bolts 26. For this purpose, there are provided drag links 28 and 29 connected at their lower ends to the clamping means 25, as indicated respectively at 30 and 31. As viewed in Figures 2 and 3, it will be noted that the clamping means 25 is arranged so as to permit the cultivating tools to be adjusted for their wider row settings. Thus, as will be noted, each of the drag links 28 and 29 have their respective ends offset with respect to each other and are arranged so that they diverge from their point of connection with the spaced portions on the front end of the tractor.

When it is desired to have the points of connection 30 and 31 closer together to provide for a narrow spacing of the cultivating tools, as shown in Figure 4, the drag links 28 and 29 are disassembled from their point of connection and are reversed or turned over, so that, when they are connected to the attaching plates 17 and 18, they will be in converging relationship, as shown in Figure 4, thereby permitting the inner pairs of working tools to be moved closer to each other. The outer pairs of tools can accordingly be moved inwardly and the tools 24 on the rear tool bar 21 can be readjusted along the tool bar.

As a means for bracing these drag links 28 and 29, there are provided diagonally extending or cross-bracing members 34 and 35, which are adapted to be attached to the respective drag links 28 and 29 by means of angle pieces 36, which are detachable from the drag links by removal of their attaching bolt means 37.

As viewed in Figure 3, it will be noted that these angle pieces 36 are located on the inner sides of the drag links, while, as viewed in Figure 4, the pieces are located on the outer sides of the drag links. The arrangement of these pieces permits the use of the same bracing members 34 and 35 in both settings of the drag links. It will also be noted that the rearward ends of the bracing members 34 and 35 have a plurality of holes 38, which also permit the rearrangement of the bracing members when the drag links 28 and 29 are reversed. One of these holes 38 is used for the bracing of the drag links when in the position shown in Figure 3, whereas another of the holes is used for the diagonal members 34 when they serve to brace the drag links 28 and 29 in the narrow settings, such as shown in Figure 4.

Extending vertically upwardly from the clamping means 25 are vertically extending bracket members 40 and 41. These bracket members 40 and 41 serve for the connection thereto of upper compression links 42 and 43, which are respectively connected to the attaching plates 17 and 18 in vertically spaced relationship with respect to the respective drag links 28 and 29. These compression links serve to stabilize the tool-carrying frame and prevent rotation of the same about its points of connection 30 and 31 with the drag links 28 and 29. The ends of the compression links 42 and 43, which attach to the bracket members 40 and 41, are turned transversely to extend through transverse holes in the brackets. When the drag links 28 and 29 are in the position shown in Figure 3, the transverse end portions may extend from the inside of the bracket through the holes therein to the outer side; whereas, when the drag links 28 and 29 are in the position shown in Figure 4, the transverse end portions of the links 42 and 43 may be turned to extend from the outer sides of the brackets 40 and 41 through the holes to the inner side of the same.

As a means for bringing the tool-carrying frame to a transport position, or for regulating the working depth of the same, there is provided an adjusting means, indicated generally at 45, on a portion 46 midship of the tractor. This adjusting means 45 includes a pair of crank arms 47 and 48 pivoted respectively in the vertically extending, upstanding brackets 49 and 50 rigidly secure to the midship portion of the tractor. These crank arms respectively extend laterally at opposite sides of the tractor for connection with the tool-carrying frame at each side of the same by means of lift rods 51 and 52, respectively, which are in turn connected at their lower ends to the tool-carrying frame. On the transversely extending portions of the crank arms 47 and 48 is connected a trunnion element 53, through which extends the lifting rod. Since on each lifting rod there is provided a lifting collar 54, this trunnion will abut the same upon the crank arms being rotated in a clockwise direction. These same collars 54 will serve as stops for limiting the downward movement of the working tools into their plowing position.

On each lifting rod there may be provided the usual lift spring 55 and a spring collar 56 for the purpose of maintaining the tool-carrying frame and the working tools in their operating positions. In the connections of the respective cranks 47 and 48 to the vertically extending brackets 49 and 50 is provided means for making possible the lifting of both sides of the frame with a single lever 57, which extends rearwardly to a location near the operator's station 13. As the operator pulls downwardly on this lever 57, the entire frame will be moved to a raised position. To assist in this operation there is provided a lifting spring 58. When it is desired to adjust one side of the frame with respect to the other, such as to effect leveling of the tool frame, the hand auxiliary adjusting lever 59 may be rotated with respect to a quadrant 60 carried by the main lever 57. Since this lever 59 is directly connected to the crank 47, the left side of the tool-carrying frame will be adjusted with respect to the right side of the frame. Since the quadrant 60 is connected with the main lever 57 and when the main lever 57 is operated, the quadrant and lever 59 will be rotated therewith to effect thereby simultaneous movement of both sides of the tool-carrying frame.

It should now be apparent that there has been provided an arrangement for the connection of drag links to a laterally extending tool-carrying frame whereby provision is made for both narrow and wide settings for pairs of cultivator tools adapted to be carried by the tool-carrying frame.

Also, it should be apparent that there has been provided a bracing means which is likewise adjustable when the drag links are adjusted from one setting to the other, thereby making possible the use of the same bracing means for both settings of the drag links.

While various changes may be made in the detail construction of the present invention, it shall be understood that such changes shall be made within the spirit and scope of the present invention as defined by the appended claims.

What is claimed is:

1. In a row-crop cultivator, in combination, tool-supporting means having spaced portions adapted for the attachment thereto of a working tool attachment, a working tool attachment including a tool-carrying frame adapted for the attachment thereto of working tools at various locations along the tool-carrying frame and spaced with respect to each other depending upon the spacing width of the crop rows being worked upon, means for connecting the attachment to the tool-supporting means including spaced link members pivotally connected respectively to the spaced portions thereof and to the tool-carrying frame in spaced relation with respect to each other, said link members respectively having one end offset with respect to its other end and thereby being reversible so that the members may be adjusted to converging or diverging positions with respect to each other to vary the distance between the points of connection of the same along the tool-carrying frame, whereby clearance is provided on the frame for a different spacing thereon of the working tools.

2. In a row-crop cultivator, in combination, tool-supporting means having spaced portions adapted for the attachment thereto of a working tool attachment, a working tool attachment including a tool-carrying frame adapted for the attachment thereto of working tools at various locations along the tool-carrying frame and spaced with respect to each other depending upon the spacing width of the crop rows being worked upon, means for connecting the attachment to the tool-supporting means including spaced link members connected respectively to the spaced portions thereof and pivotally connected to the tool-carrying frame in spaced relation with respect to each other, said link members respectively having one end offset with respect to its other end and thereby reversible so that the members may be adjusted to converging or diverging positions with respect to each other to vary the distance between the points of connection of the same along the tool-carrying frame, whereby clearance is provided on the frame for a different spacing thereon of the working tools, means disposed intermediate the link members for bracing the same with respect to each other, said bracing means being connected at points inside the drag links during one position, and means for connecting said bracing means to the links at points outside the links during reverse position.

3. In a row-crop cultivator, in combination, tool-supporting means having spaced portions adapted for the attachment thereto of a working tool attachment, a working tool attachment including a tool-carrying frame adapted for the attachment thereto of working tools at various locations along the tool-carrying frame and spaced with respect to each other depending upon the spacing width of the crop rows being worked upon, means for connecting the attachment to the tool-supporting means including spaced link members connected respectively to the spaced portions thereof and to the tool-carrying frame in spaced relation with respect to each other, said link members respectively having one end offset with respect to its other end and reversible so that the members may be adjusted to converging or diverging positions with respect to each other to vary the distance between the points of connection of the same along the tool-carrying frame, whereby clearance is provided on the frame for a different spacing thereon of the working tools, means connecting the link members for bracing the same with respect to each other and including two diagonally arranged bracing members connected to the drag links at points lying within a space formed by the links during one position, and means for connecting the bracing members to the links at points lying without said space upon reversing of said links.

4. In combination, a tractor having spaced portions adapted for the attachment thereto of a cultivator attachment, a cultivator attachment extending generally transversely of the tractor and including a transverse tool bar adapted for the attachment thereto of individual cultivator shovels spaced along the tool bar with respect to each other depending upon the spacing width of the crop rows being worked upon, means for connecting the attachment to the tractor including spaced drag link members connected respectively to the spaced portions of the tractor and pivotally connected to the tool bar in spaced relation with respect to each other, said link members having respectively one end offset transversely with respect to its other end and being readily detachable for adjustment so that the members may be adjusted to converging or diverging positions with respect to each other to vary the distance between the points of connection of the same along the tool bar, whereby clearance is provided for a different spacing of the cultivator shovels along the tool bar.

5. In combination, a tractor having spaced portions on its forward end adapted for the attachment thereto of a cultivator attachment, a cultivator attachment extending generally transversely at a location beneath the tractor and including a transverse tool bar adapted for the attachment thereto of individual cultivator shovels arranged in pairs to cultivate respective crop rows and the said pairs being spaced with respect to each other depending upon the spacing width of the crop rows being worked upon, means for connecting the attachment to the forward end of the tractor including spaced drag link members connected respectively to the spaced portions thereon and to the tool bar in spaced relation with respect to each other, said link members having respectively one end offset with respect to its other end and being reversible so that the members may be adjusted to converging or diverging positions with respect to each other to vary the distance between the points of connection of the same along the tool bar, whereby clearance is provided for a different spacing of the pairs of cultivator shovels along the tool bar.

6. In combination, a tractor having spaced portions on its forward end adapted for the attachment thereto of a cultivator attachment, a cultivator attachment extending generally transversely of the tractor and including a transverse tool bar adapted for the attachment thereto of individual cultivator shovels spaced along the tool bar with respect to each other depending upon the spacing width of the crop rows being worked upon, means for connecting the attachment to the tractor including spaced drag link members pivotally connected respectively to the spaced portions of the tractor and pivotally connected to the tool bar in spaced relation with respect to each other, said link members having respectively one end offset transversely with respect to its other end and being quickly detachable and reversible so that the members may be adjusted to converging or diverging positions with respect to each other to vary the distance between the points of connection of the same along the tool bar, whereby clearance is provided for a different spacing of the cultivator shovels along the tool bar, means disposed intermediate the drag link members for bracing the same with respect to each other, said bracing means being adjustable to be effective for bracing in either the original or reversed positions of the drag link members.

HIRAM P. SMITH.